United States Patent
Takebayashi et al.

(10) Patent No.: US 12,283,190 B2
(45) Date of Patent: Apr. 22, 2025

(54) DRIVER ASSISTANCE APPARATUS AND RECORDING MEDIUM CONTAINING COMPUTER PROGRAM

(71) Applicant: SUBARU CORPORATION, Tokyo (JP)

(72) Inventors: Yosuke Takebayashi, Tokyo (JP); Yu Yoshida, Tokyo (JP); Riku Kato, Tokyo (JP); Hideyuki Takao, Tokyo (JP); Ryuichi Sumikawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/928,421

(22) PCT Filed: Sep. 28, 2021

(86) PCT No.: PCT/JP2021/035511
§ 371 (c)(1),
(2) Date: Nov. 29, 2022

(87) PCT Pub. No.: WO2023/053165
PCT Pub. Date: Apr. 6, 2023

(65) Prior Publication Data
US 2024/0233545 A1 Jul. 11, 2024

(51) Int. Cl.
*G08G 1/16* (2006.01)
*B60W 30/09* (2012.01)
*B60W 30/095* (2012.01)

(52) U.S. Cl.
CPC ......... *G08G 1/166* (2013.01); *B60W 30/0956* (2013.01); *B60W 2554/4044* (2020.02); *B60W 2554/802* (2020.02)

(58) Field of Classification Search
CPC ..... G08G 1/166; G08G 1/16; B60W 30/0956; B60W 2554/4044; B60W 2554/802; B60W 30/095; B60W 30/09; B60W 30/0953
(Continued)

(56) References Cited

U.S. PATENT DOCUMENTS

2003/0006889 A1 1/2003 Koike
2005/0033516 A1* 2/2005 Kawasaki ............. G01C 21/26
340/436
(Continued)

FOREIGN PATENT DOCUMENTS

CN 115123237 A 9/2022
JP 2000-276696 A 10/2000
(Continued)

OTHER PUBLICATIONS

International Search Report in the corresponding International Application No. PCT/JP2021/035511 dated Nov. 16, 2021, with English Translation (6 pages).
(Continued)

*Primary Examiner* — Tyler D Paige
(74) *Attorney, Agent, or Firm* — Rimon P.C.

(57) ABSTRACT

A driver assistance apparatus is configured to carry out processing including: detecting a moving body and surrounding environment around the vehicle; predicting driving actions of the moving body detected; calculating collision risks between the moving body and the vehicle after a predetermined period of time, for the respective driving actions predicted of the moving body, on the basis of distances between the moving body and the vehicle after the predetermined period of time and probabilities that the moving body takes the respective driving actions; and
(Continued)

setting a driving condition of the vehicle that provides a smallest one of the collision risks.

7 Claims, 7 Drawing Sheets

(58) Field of Classification Search
USPC .......................................................... 701/26
See application file for complete search history.

(56) References Cited

U.S. PATENT DOCUMENTS

| | | | |
|---|---|---|---|
| 2008/0269992 A1* | 10/2008 | Kawasaki | G01C 21/3697 701/45 |
| 2012/0218093 A1 | 8/2012 | Yoshizawa et al. | |
| 2013/0293395 A1* | 11/2013 | Ohama | G08G 1/166 340/904 |
| 2015/0166058 A1 | 6/2015 | Mizutani et al. | |
| 2015/0294568 A1 | 10/2015 | Shibata | |
| 2017/0162050 A1* | 6/2017 | Chen | G05D 1/0055 |
| 2017/0248949 A1* | 8/2017 | Moran | G08G 1/165 |
| 2019/0072966 A1* | 3/2019 | Zhang | G05D 1/646 |
| 2020/0023838 A1 | 1/2020 | Zhang | |
| 2020/0339159 A1 | 10/2020 | Zhong et al. | |
| 2020/0342756 A1 | 10/2020 | Mackenzie | |
| 2021/0284141 A1 | 9/2021 | Sugaya | |
| 2021/0370921 A1 | 12/2021 | Silva et al. | |

FOREIGN PATENT DOCUMENTS

| | | |
|---|---|---|
| JP | 2011-096105 A | 5/2011 |
| JP | 2015-118510 A | 6/2015 |
| JP | 2015-203948 A | 11/2015 |
| JP | 2018-197048 A | 12/2018 |
| JP | 2020-015493 A | 1/2020 |
| JP | 2021-142788 A | 9/2021 |
| WO | 2021/242702 A1 | 12/2021 |

OTHER PUBLICATIONS

Office Action issued in the corresponding Japanese Application No. 2023-550756 dated Jan. 7, 2025, w/ English Translation.

* cited by examiner

[ FIG. 1 ]
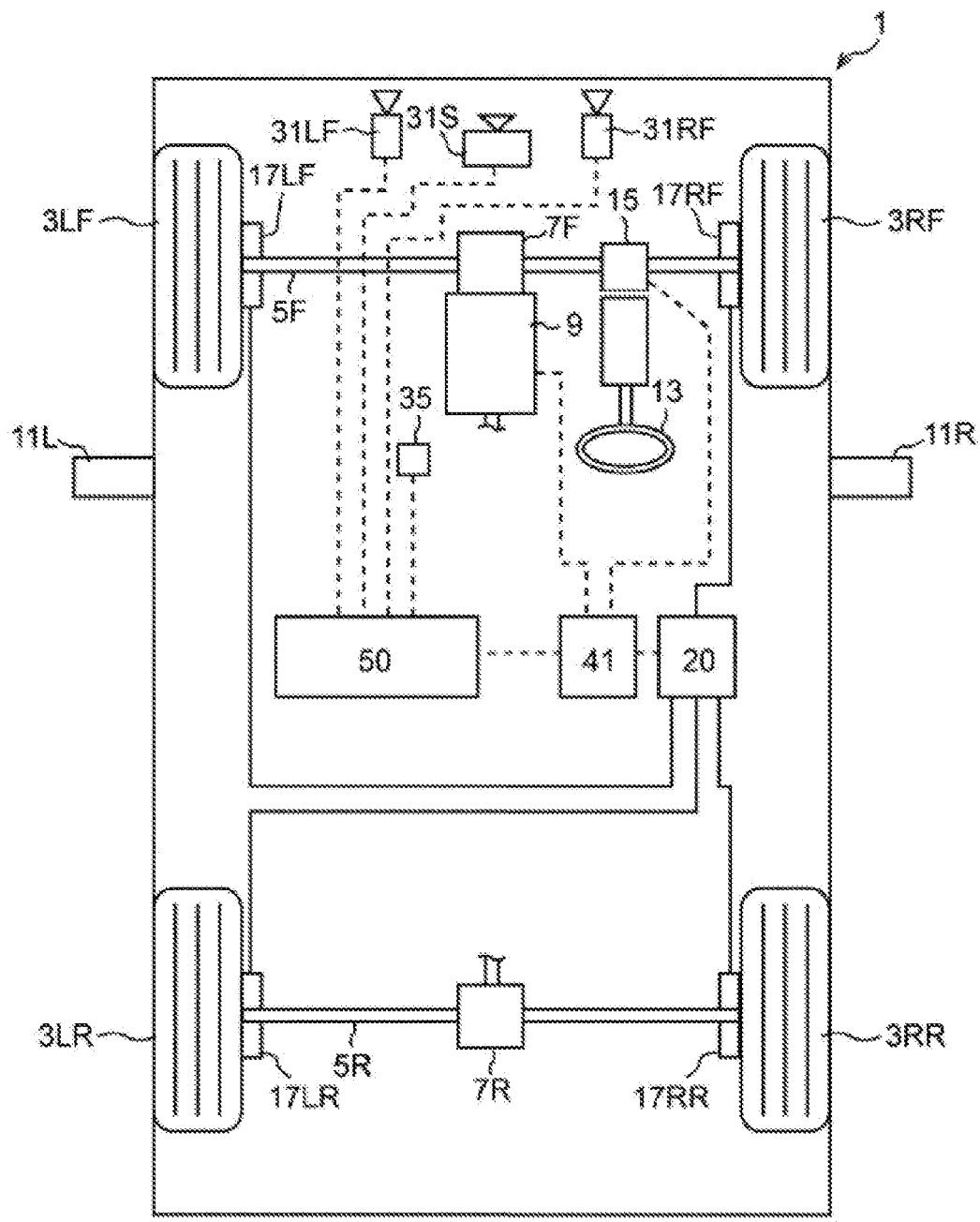

[FIG. 2]
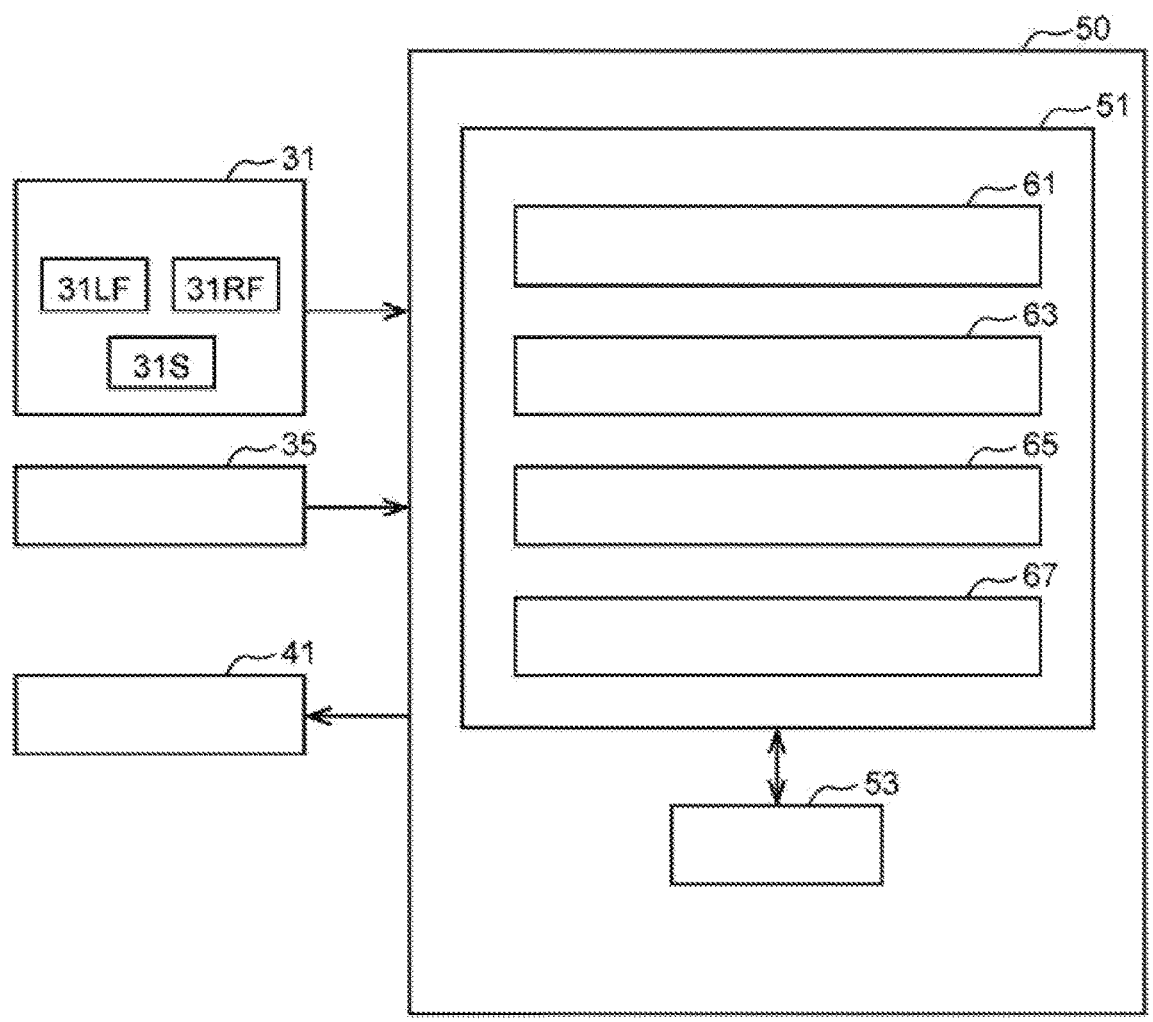

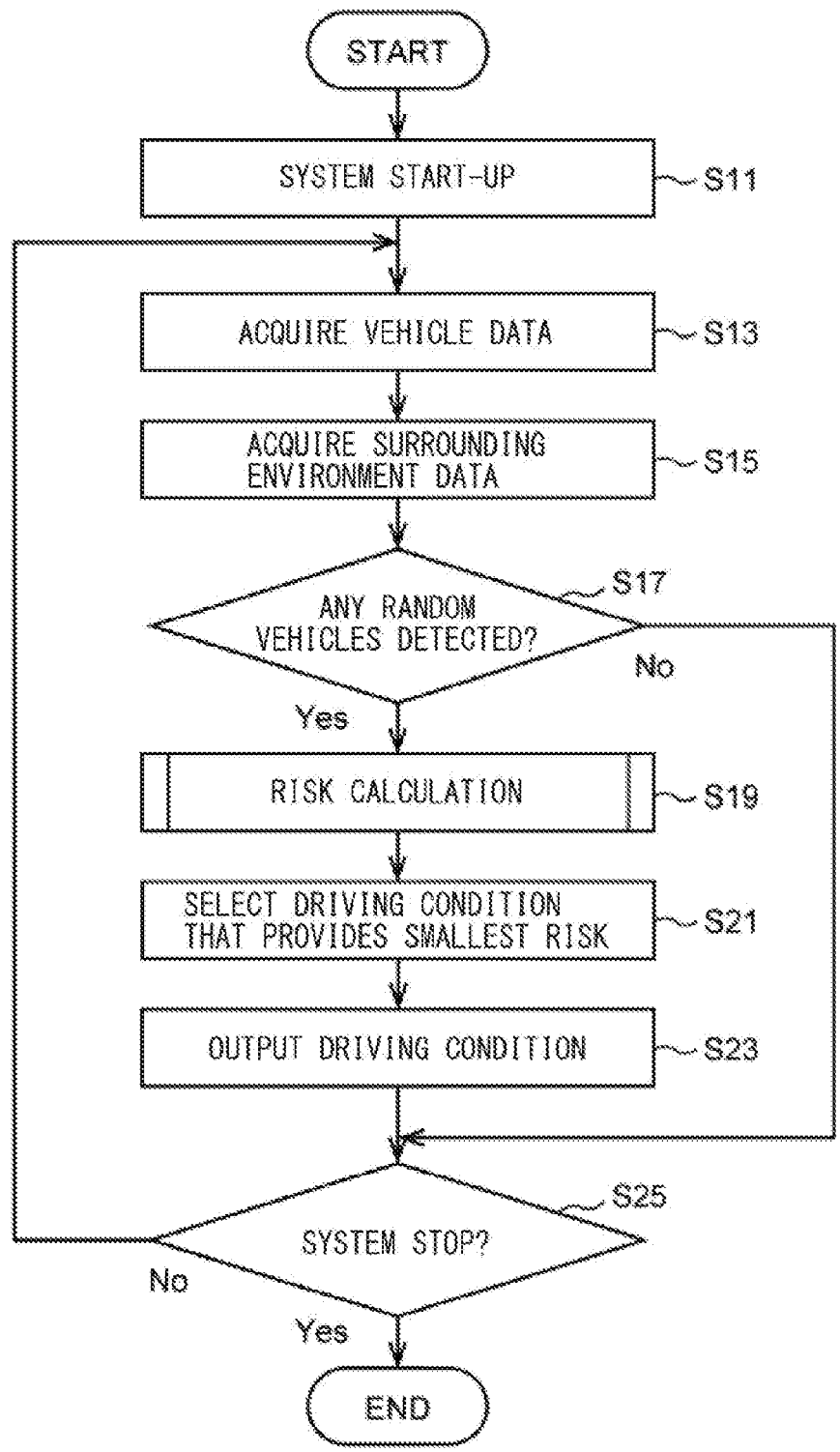
[FIG. 3]

[ FIG. 4 ]
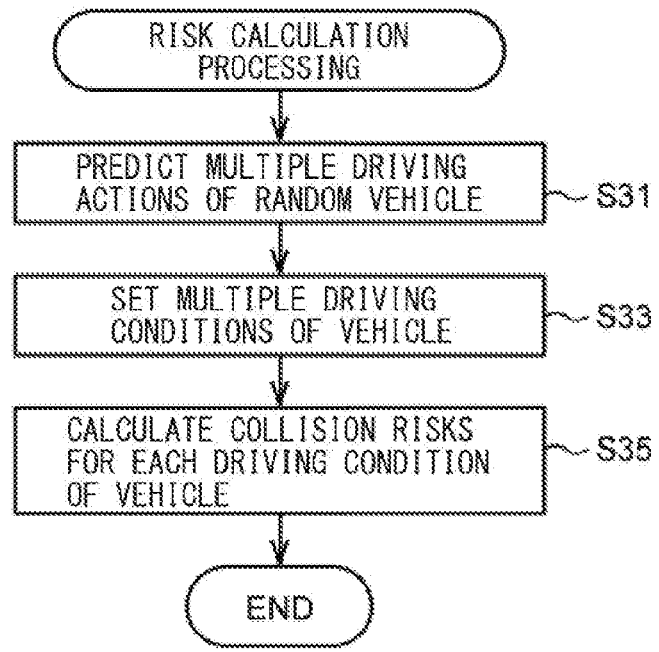
[ FIG. 5 ]
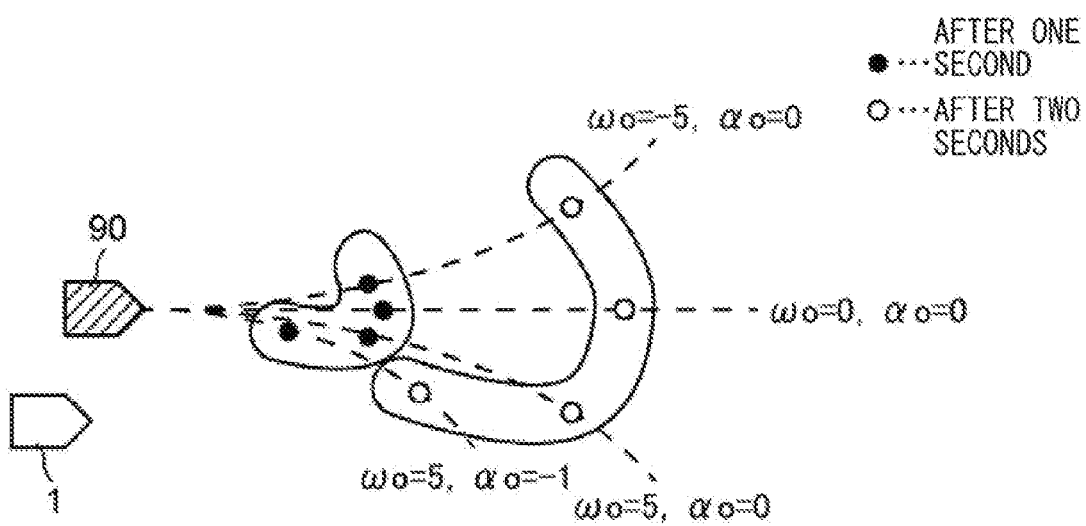

[ FIG. 6 ]
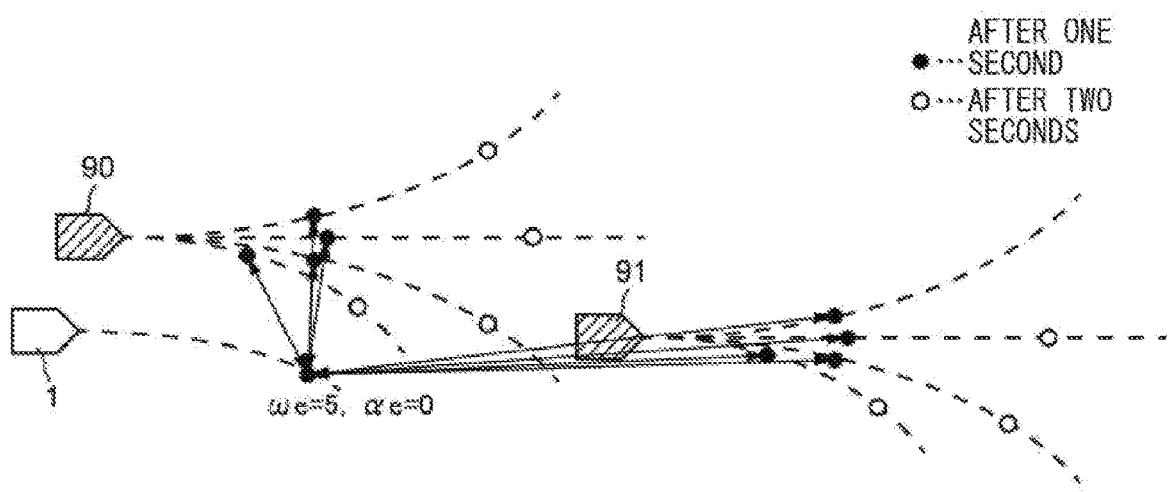
[ FIG. 7 ]
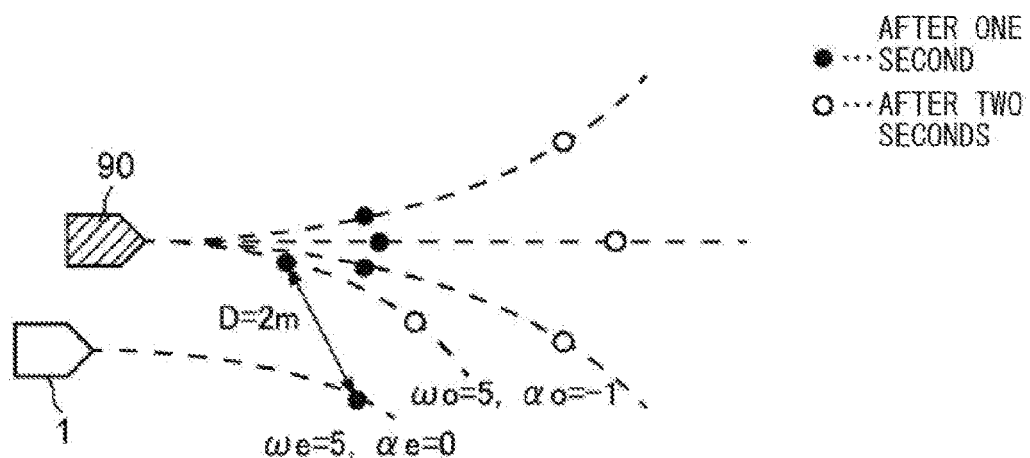

[FIG. 8]
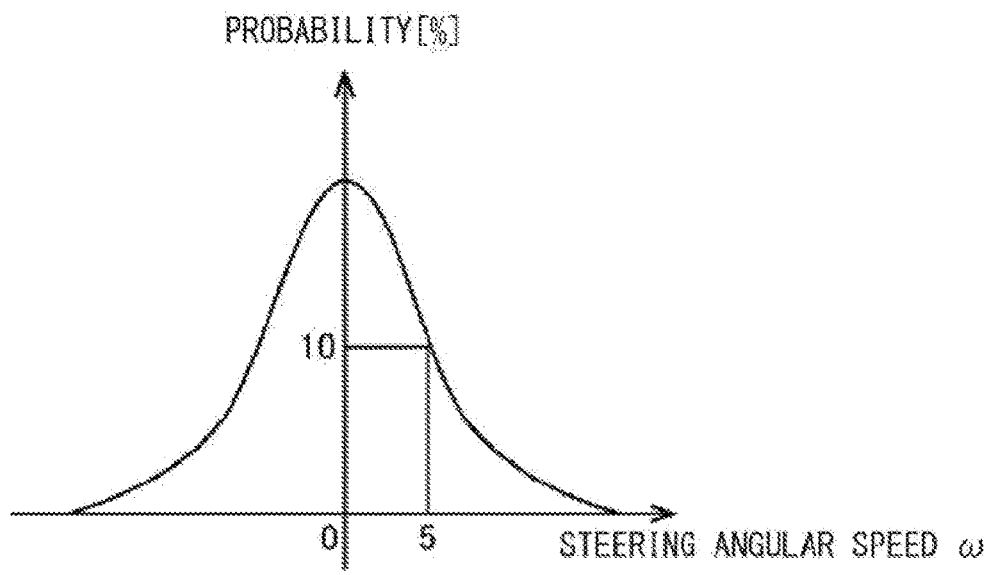
[FIG. 9]
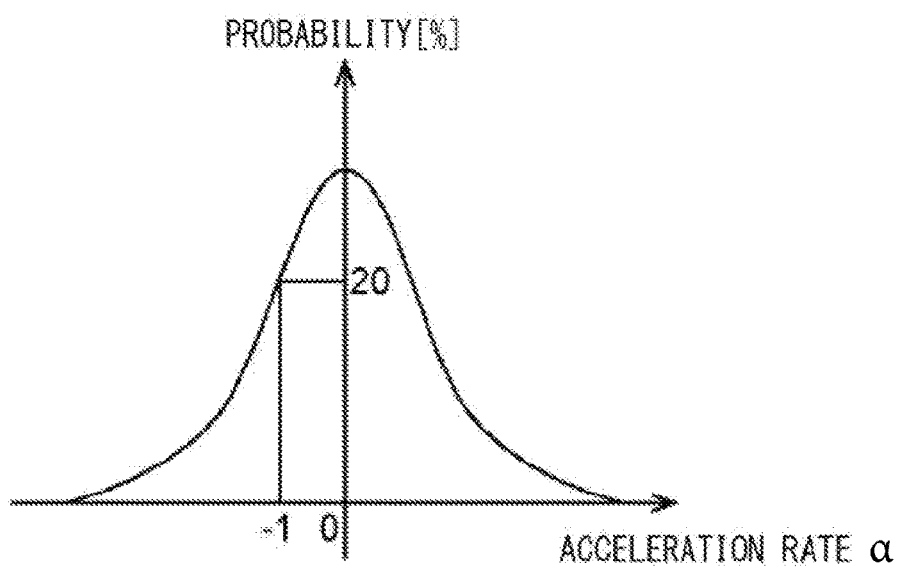

[ FIG. 10 ]
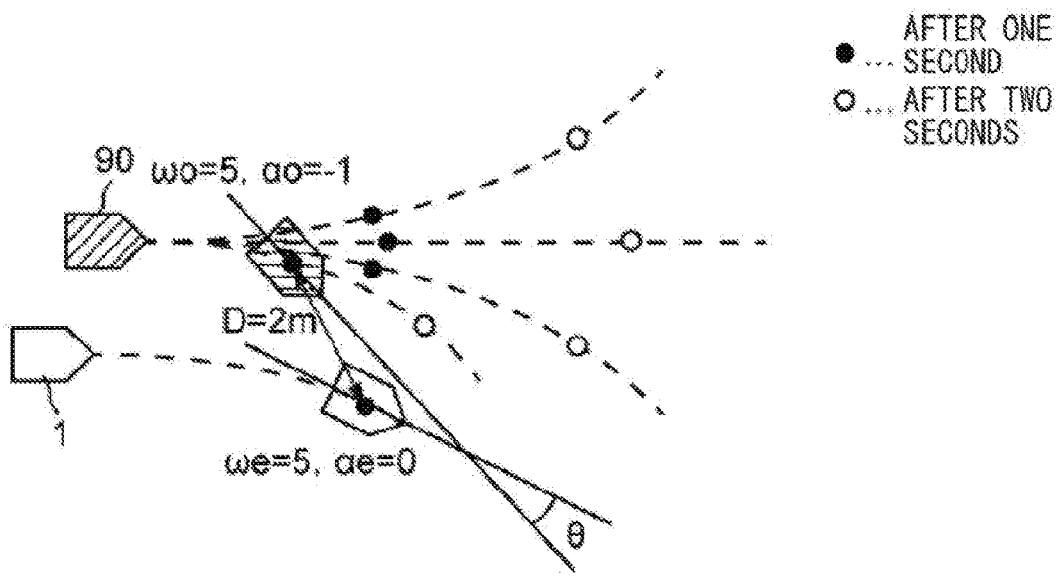
[ FIG. 11 ]
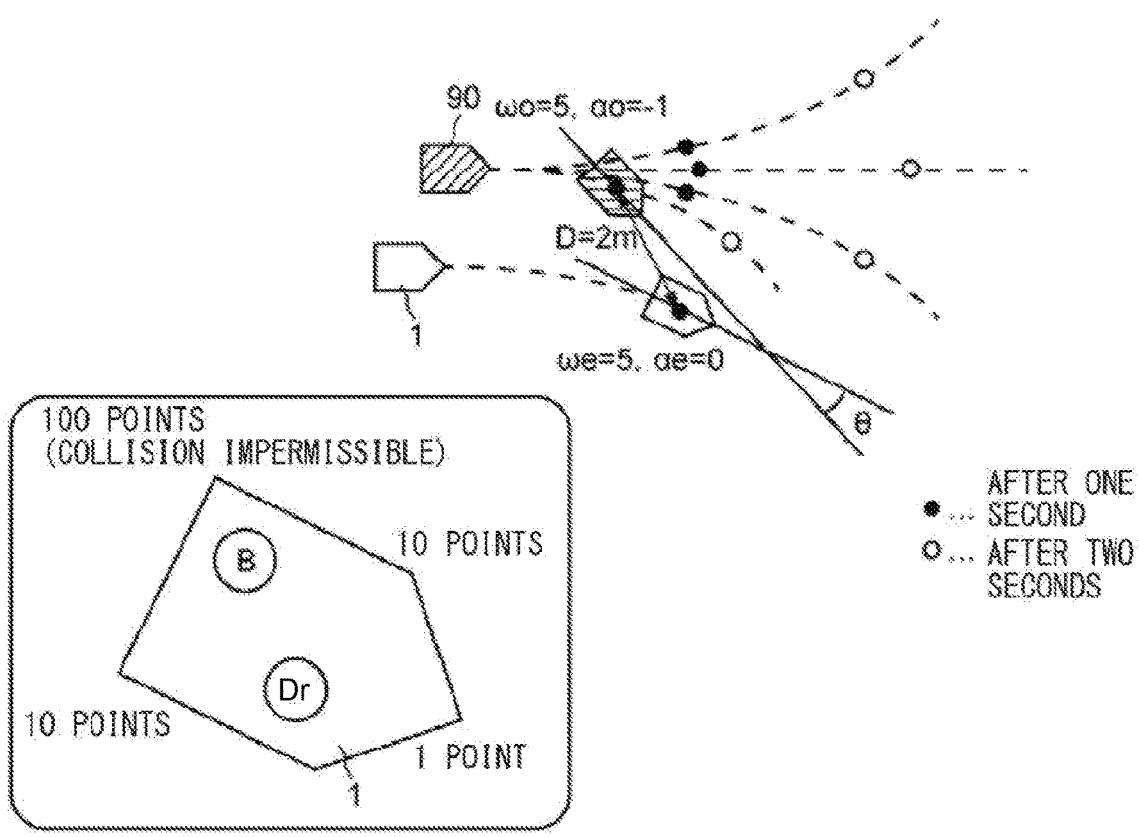

DRIVER ASSISTANCE APPARATUS AND RECORDING MEDIUM CONTAINING COMPUTER PROGRAM

CROSS REFERENCE TO RELATED APPLICATIONS

This application is the U.S. National Phase under 35 US.C. § 371 of International Application No. PCT/JP2021/035511, filed on Sep. 28, 2021, the entire contents of each are hereby incorporated by reference.

TECHNICAL FIELD

The disclosure relates to a driver assistance apparatus and a recording medium containing a computer program that assist in driving a vehicle on the basis of a collision risk with an obstacle around the vehicle.

BACKGROUND ART

Recently, the practical application of vehicles equipped with a driver assistance function and an automated driving function has been promoted mainly for the purpose of reduction in traffic accidents and reduction in a burden of driving. For example, apparatuses have been known that detect an obstacle present around the vehicle on the basis of data detected by various sensors, e.g., a vehicle outside capturing camera and LiDAR (Light Detection and Ranging) provided in the vehicle, and assist in driving a vehicle, to avoid collision between the vehicle and the obstacle.

For such a driver assistance apparatus, Patent Literature 1 makes a proposal for a collision avoidance control apparatus that determines whether or not an avoidance route is a safe traveling route. Specifically, Patent Literature 1 discloses a collision avoidance control apparatus including an avoidance route setting means, a reliability calculation means, an automated steering control means, and a unit region identification means. The avoidance route setting means sets an avoidance route to avoid a collision with an obstacle ahead. The reliability calculation means calculates reliability of the avoidance route. The automated steering control means determines whether or not to carry out automated steering along the avoidance route. The unit region identification means identifies whether a unit area is an obstacle area or whether the unit area is an unclear area. The unit area is formed by dividing a region ahead of a vehicle into a plurality of areas. At the same distance from the vehicle, higher cost is set for the obstacle area than the unclear area. The reliability calculation means calculates cost of an avoidance region on the basis of the number and the cost of the obstacle regions present in the avoidance region including the avoidance route, and the number and the cost of the unclear regions present in the avoidance region. On the basis of the cost for the avoidance region, the reliability calculation means calculates the reliability of the avoidance route.

Moreover, Patent Literature 2 makes a proposal for a system that confirms or recognizes how an obstacle is going to behave in its environment, to reduce a collision risk. Specifically, Patent Literature 2 discloses a system that: calculates one or more predicted loci with respect to each object on the basis of map and route data, to generate a set of the predicted loci with respect to the relevant object; lists a plurality of combinations of the predicted loci to be possibly traveled by the object in the driving environment, with the use of the set of the predicted loci; calculates a risk value for each combination, to generate a plurality of corresponding risk values; and controls an automated driven vehicle on the basis of a combination having a lowest risk value included in the corresponding risk values.

CITATION LIST

Patent Literature

Patent Literature 1: Japanese Unexamined Patent Application Publication No. 2018-197048
Patent Literature 2: Japanese Unexamined Patent Application Publication No. 2020-015493

SUMMARY OF INVENTION

Problem to be Solved by the Invention

However, the collision avoidance control apparatus described in Patent Literature 1 does not consider motion of random vehicles around the vehicle. Accordingly, depending on the motion of random vehicles, there is possibility of higher risk of collision or higher risk of failure to be incurred by the collision. Moreover, although the system described in Patent Literature 2 considers the motion of random vehicles, the system described in Patent Literature 2 only predicts an intention of movement of a random vehicle, e.g., turning left, turning right, traveling straight, or traveling backward, in consideration of the map and the route data, and traffic rules. The system described in Patent Literature 2 is not able to predict the motion of a random vehicle unpredictable from the map and the route. Accordingly, depending on the motion of random vehicles, the system described in Patent Literature 2 also has possibility of high risk of collision or high risk of failure to be incurred by the collision.

The disclosure is made in view of such a problem, and it is an object of the disclosure to provide a driver assistance apparatus and a recording medium containing a computer program that make it possible to reduce risk of collision of a vehicle with a moving body in consideration of predicted motion of the moving body.

Means for Solving the Problem

To solve the above-described problem, according to an aspect of the disclosure, a driver assistance apparatus is provided. The driver assistance apparatus is configured to sets a driving condition of a vehicle on the basis of a collision risk of the vehicle with an obstacle around the vehicle. The driver assistance apparatus includes: one or more processors; and one or more memories communicably coupled to the one or more processors. The processors are configured to carry out processing including: detecting a moving body and surrounding environment around the vehicle; predicting driving actions of the moving body detected; calculating collision risks between the moving body and the vehicle after a predetermined period of time, for the respective driving actions predicted of the moving body, on the basis of distances between the moving body and the vehicle after the predetermined period of time and probabilities that the moving body takes the respective driving actions; and setting the driving condition of the vehicle that provides a smallest one of the collision risks.

Moreover, to solve the above-described problem, according to another aspect of the disclosure, a recording medium containing a computer program applicable to a driver assistance apparatus is provided. The driver assistance apparatus is configured to set a driving condition of a vehicle on the basis of a collision risk of the vehicle with an obstacle around the vehicle. The computer program causes one or more processors to carry out processing including: detecting a moving body and surrounding environment around the vehicle; predicting driving actions of the moving body detected; calculating collision risks between the moving body and the vehicle after a predetermined period of time, for the respective driving actions predicted of the moving body, on the basis of distances between the moving body and the vehicle after the predetermined period of time and probabilities that the moving body takes the respective driving actions; and setting the driving condition of the vehicle that provides a smallest one of the collision risks.

Effects of the Invention

As described above, according to the disclosure, it is possible to reduce risk of collision of the vehicle with a moving body in consideration of predicted motion of the moving body.

BRIEF DESCRIPTION OF DRAWINGS

FIG. 1 is a schematic diagram that illustrates a configuration example of a vehicle including a driver assistance apparatus according to an embodiment of the disclosure.

FIG. 2 is a block diagram that illustrates a configuration example of the driver assistance apparatus according to the embodiment.

FIG. 3 is a flowchart of an example of processing by the driver assistance apparatus according to the embodiment.

FIG. 4 is a flowchart of an example of risk calculation processing by the driver assistance apparatus according to the embodiment.

FIG. 5 is an explanatory diagram that illustrates an example of prediction of driving actions of a random vehicle by the driver assistance apparatus according to the embodiment.

FIG. 6 is an explanatory diagram that illustrates positions of the random vehicle and the vehicle after a predetermined period of time to be predicted by the driver assistance apparatus according to the embodiment.

FIG. 7 is an explanatory diagram that illustrates an example of calculation of risk after the predetermined period of time by the driver assistance apparatus according to the embodiment.

FIG. 8 is an explanatory diagram that illustrates an example of probability data regarding a steering angular speed of the random vehicle.

FIG. 9 is an explanatory diagram that illustrates an example of probability data regarding an acceleration rate of the random vehicle.

FIG. 10 is an explanatory diagram that illustrates an example of calculation of a risk after a predetermined period of time in consideration of a failure risk, by a driver assistance apparatus according to a modification example of the embodiment.

FIG. 11 is an explanatory diagram that illustrates an example of calculation of risk after the predetermined period of time in consideration of collision position risk, by the driver assistance apparatus according to the modification example of the embodiment.

MODES FOR CARRYING OUT THE INVENTION

In the following, some preferred embodiments of the disclosure are described in detail with reference to the accompanying drawings. Note that throughout the present description and the drawings, elements having substantially the same function and configuration are denoted with the same reference numerals to avoid any redundant description.

<1. Overall Configuration of Vehicle>

FIG. 1 is a schematic diagram that illustrates a configuration example of a vehicle 1 including a driver assistance apparatus 50 according to the present embodiment. The vehicle 1 illustrated in FIG. 1 is constituted as a four-wheel drive vehicle that transmits driving torque to a left front wheel 3LF, a right front wheel 3RF, a left rear wheel 3LR, and a right rear wheel 3RR (in the following, collectively referred to as "wheels 3" unless distinction is particularly necessary). The driving torque is outputted from a driving force source 9 that generates the driving torque for the vehicle 1. The driving force source 9 may be an internal combustion engine such as a gasoline engine or a diesel engine, or may be a driving motor. The driving force source 9 may include an internal combustion engine and a driving motor together.

It is to be noted that the vehicle 1 may be an electric vehicle including two driving motors, e.g., a front wheel driving motor and a rear wheel driving motor, or may be an electric vehicle including driving motors that correspond to the respective wheels 3. Moreover, in a case where the vehicle 1 is an electric vehicle or a hybrid electric vehicle, a secondary battery, and a generator such as a motor and a fuel cell are mounted on the vehicle 1. The secondary battery accumulates electric power to be supplied to the driving motor. The generator generates electric power to be charged in the battery.

The vehicle 1 includes the driving force source 9, an electric steering device 15, and a brake hydraulic control unit 20, as devices to be used in a driving control of the vehicle 1. The driving force source 9 outputs the driving torque to be transmitted to a front wheel driving shaft 5F and a rear wheel driving shaft 5R through an unillustrated transmission, a front wheel differential mechanism 7F, and a rear wheel differential mechanism 7R. Driving of the driving force source 9 and the transmission is controlled by a vehicle control device 41 including one or more electronic control units (ECU: Electronic Control Unit).

The electric steering device 15 is provided on the front wheel driving shaft 5F. The electric steering device 15 includes an unillustrated electric motor and an unillustrated gear mechanism. The electric steering device 15 is controlled by the vehicle control device 41 to adjust steering angles of the left front wheel 3LF and the right front wheel 3RF. In manual driving, the vehicle control device 41 controls the electric steering device 15 on the basis of a steering angle of a steering wheel 13 by a driver. Moreover, in automated driving, the vehicle control device 41 controls the electric steering device 15 on the basis of a target steering angle to be set by the driver assistance apparatus 50 or an unillustrated automated driving control device.

A brake system of the vehicle 1 is constituted as a hydraulic brake system. The brake hydraulic control unit 20 adjusts hydraulic pressure to be supplied to each of brake calipers 17LF, 17RF, 17LR, and 17RR (hereinafter, collectively referred to as "brake calipers 17" unless distinction is particularly necessary) provided respectively on the front, rear, left, and right drive wheels 3LF, 3RF, 3LR, and 3RR, to generate a braking force. Driving of the brake hydraulic control unit 20 is controlled by the vehicle control device 41. In the case where the vehicle 1 is an electric vehicle or a hybrid electric vehicle, the brake hydraulic control unit 20 is used in conjunction with a regenerative brake by the driving motor.

The vehicle control device 41 includes one or more electronic control devices that control driving of the driving force source 9, the electric steering device 15, and the brake hydraulic control unit 20. The driving force source 9 outputs the driving torque for the vehicle 1. The electric steering device 15 controls the steering angle of the steering wheel 13 or a steering wheel. The brake hydraulic control unit 20 controls the braking force of the vehicle 1. The vehicle control device 41 may have a function of controlling the driving of the transmission that performs shifting of the driving torque from the driving force source 9 and transmits the resultant driving torque to the wheels 3. The vehicle control device 41 is configured to acquire data transmitted from the driver assistance apparatus 50 or the unillustrated automated driving control device, and is configured to carry out an automated driving control of the vehicle 1. Moreover, in the manual driving of the vehicle 1, the vehicle control device 41 acquires data regarding an amount of an operation by the driving by the driver, and controls the driving of the driving force source 9, the electric steering device 15, and the brake hydraulic control unit 20. The driving force source 9 outputs the driving torque for the vehicle 1. The electric steering device 15 controls the steering angle of the steering wheel 13 or the steering wheel. The brake hydraulic control unit 20 controls the braking force of the vehicle 1.

Moreover, the vehicle 1 includes forward view capturing cameras 31LF and 31RF, LiDAR (Light Detection And Ranging) 31S, and a vehicle state sensor 35.

The forward view capturing cameras 31LF and 31RF, and the LiDAR 31S constitute a surrounding environment sensor to acquire data regarding surrounding environment around the vehicle 1. The forward view capturing cameras 31LF and 31RF capture a forward view of the vehicle 1 and generate image data. The forward view capturing cameras 31LF and 31RF include imaging elements such as CCD (Charged-Coupled Devices) or CMOS (Complementary Metal-Oxide-Semiconductor), and transmit the generated image data to the driver assistance apparatus 50.

In the vehicle 1 illustrated in FIG. 1, the forward view capturing cameras 31LF and 31RF constitute a stereo camera including a pair of left and right cameras. However, the forward view capturing cameras 31LF and 31RF may each be a monocular camera. In addition to the forward view capturing cameras 31LF and 31RF, the vehicle 1 may include, for example, a rearward view capturing camera, or a left or right rearward view capturing camera. The rearward view capturing camera is provided in a rear part of the vehicle 1 and captures a rearward view. The left or right rearward view capturing camera is provided on a side mirror 11L or 11R.

The LiDAR 31S transmits optical waves and receives reflected waves of the optical waves, and detects an obstacle, a distance to the obstacle, and a position of the obstacle on the basis of time from the transmission of the optical waves to the reception of the reflected waves. The LiDAR 31S transmits detection data to the driver assistance apparatus 50. In place of the LiDAR 31S, or together with the LiDAR 31S, the vehicle 1 may include any one or more sensors out of a radar sensor such as millimeter wave radar, and an ultrasonic sensor, as the surrounding environment sensor that acquires data regarding the surrounding environment.

The vehicle state sensor 35 includes one or more sensors that detect an operation state and behavior of the vehicle 1. The vehicle state sensor 35 includes, for example, at least one of a steering angle sensor, an accelerator position sensor, a brake stroke sensor, a brake pressure sensor, or an engine speed sensor. These sensors each detect the operation state of the vehicle 1 such as the steering angle of the steering wheel 13 or the steering wheel, an accelerator position, an amount of a brake operation, or an engine speed. Moreover, the vehicle state sensor 35 includes, for example, at least one of a vehicle speed sensor, an acceleration rate sensor, or an angular speed sensor. These sensors each detect the behavior of the vehicle such as a vehicle speed, a longitudinal acceleration rate, a lateral acceleration rate, and a yaw rate. Moreover, the vehicle state sensor 35 may include a sensor that detects an operation of a turn signal lamp. The vehicle state sensor 35 transmits a sensor signal including the detected data, to the driver assistance apparatus 50.

<2. Driver Assistance Apparatus>

Next, the driver assistance apparatus 50 according to the present embodiment is described in detail.

In the following description, the vehicle as a target of the assistance on which the driver assistance apparatus 50 is mounted is referred to as the vehicle, while a vehicle around the vehicle 1 is referred to as a random vehicle.

2-1. Configuration Example

FIG. 2 is a block diagram illustrating a configuration example of the driver assistance apparatus 50 according to the present embodiment.

The driver assistance apparatus 50 functions as an apparatus that assists in driving the vehicle 1 by allowing one or more processors such as a CPU (Central Processing Unit) to execute the computer program. The computer program is a computer program that causes the processors to perform operation described later to be performed by the driver assistance apparatus 50. The computer program to be executed by the processors may be contained in a recording medium functioning as a storage 53 (memory) provided in the driver assistance apparatus 50. Alternatively, the computer program to be executed by the processors may be contained in a recording medium built in the driver assistance apparatus 50, or any recording medium externally attachable to the driver assistance apparatus 50.

The recording medium containing the computer program may be: a magnetic medium such as a hard disk, a floppy disk, and a magnetic tape; an optical recording medium such as a CD-ROM (Compact Disk Read Only Memory), a DVD (Digital Versatile Disk), and a Blu-ray (registered trademark); a magnetic-optical medium such as a floptical disk; a storage element such as a RAM (Random Access Memory) and a ROM (Read Only Memory); a flash memory such as a USB (Universal Serial Bus) memory and an SSD (Solid State Drive); or any other medium that is able to hold programs.

To the driver assistance apparatus 50, the surrounding environment sensor 31 and the vehicle state sensor 35 are coupled through a dedicated line, or communication means such as CAN (Controller Area Network) or LIN (Local Inter Net). Moreover, to the driver assistance apparatus 50, the vehicle control device 41 is coupled through a dedicated line, or the communication means such as CAN or LIN. It is to be noted that the driver assistance apparatus 50 is not limited to an electronic control device mounted on the vehicle 1, but may be a terminal device such as a smartphone or a wearable device.

The driver assistance apparatus 50 includes a processor 51 and the storage 53. The processor 51 includes one or more processors such as a CPU. A portion or all of the processor 51 may include an updatable one such as firmware, or may be, for example, a program module to be executed in accordance with a command from, for example, a CPU. The storage 53 includes a memory such as a RAM or a ROM. The storage 53 is communicably coupled to the processor 51. However, there is no particular limitation on the number of the storages 53 and the kind of the storage 53. The storage 53 holds a computer program to be executed by the processor 51, and data to be used in calculation processing, e.g., various parameters, detection data, and calculation results.

(2-2. Functional Configuration)

As illustrated in FIG. 2, the processor 51 of the driver assistance apparatus 50 includes a surrounding environment data acquisition unit 61, a vehicle data acquisition unit 63, a risk calculation unit 65, and a driving condition setting unit 67. These units each are a function to be realized by execution of a computer program by a processor such as a CPU. However, some of these units may include an analog circuit. In the following, after brief description of the function of each unit of the processor 51, specific processing operation is described.

(Surrounding Environment Data Acquisition Unit)

The surrounding environment data acquisition unit 61 detects the surrounding environment around the vehicle 1 on the basis of the detection data transmitted from the surrounding environment sensor 31. Specifically, the surrounding environment data acquisition unit 61 detects at least an obstacle present around the vehicle 1 and a traveling lane. The surrounding environment data acquisition unit 61 obtains data regarding the obstacle such as a kind, a size, a position, and a speed of the obstacle detected, a distance from the vehicle 1 to the obstacle, and a relative speed between the vehicle 1 and the obstacle. The obstacle to be detected includes a random vehicle traveling, a parked vehicle, pedestrians, bicycles, sidewalls, curb stones, buildings, utility poles, traffic signs, traffic lights, natural objects, and any other objects present around the vehicle 1. Moreover, the surrounding environment data acquisition unit 61 may calculate a distance from the vehicle 1 to a border of the traveling lane. The border of the traveling lane is recognized by, for example, a lane line, a sidewall, and a curb stone.

Moreover, in a case where the surrounding environment data acquisition unit 61 detects a random vehicle, the surrounding environment data acquisition unit 61 obtains a yaw rate of the relevant random vehicle. The yaw rate of the random vehicle is obtained, by calculation, on the basis of, for example, a change in posture of the random vehicle obtained from the image data of the forward view capturing cameras 31LF and 31RF. In a case where the vehicle 1 and the random vehicle are able to establish vehicle-to-vehicle communication, the surrounding environment data acquisition unit 61 may acquire, from the relevant random vehicle, by the vehicle-to-vehicle communication, necessary data such as the yaw rate, a yaw acceleration rate, a yaw angle acceleration rate, a vehicle speed, and an acceleration rate. The surrounding environment data acquisition unit 61 detects the data regarding the surrounding environment on predetermined cycles, and records the data in the storage 53.

(Vehicle Data Acquisition Unit)

The vehicle data acquisition unit 63 acquires data regarding the operation state and the behavior of the vehicle 1 on the basis of the detection data transmitted from the vehicle state sensor 35. The vehicle data acquisition unit 63 acquires the data regarding the operation state of the vehicle 1 such as the steering angle of the steering wheel or the steering wheel, the accelerator position, the amount of the brake operation, or the engine speed. Moreover, the vehicle data acquisition unit 63 acquires the data regarding the behavior of the vehicle 1 such as the vehicle speed, the longitudinal acceleration rate, the lateral acceleration rate, and the yaw rate. The vehicle data acquisition unit 63 acquires these pieces of data on predetermined calculation cycles, and records these pieces of the data in the storage 53.

(Risk Calculation Unit)

The risk calculation unit 65 obtains, by calculation, a collision risk of the vehicle 1 with respect to the moving body detected by the surrounding environment data acquisition unit 61. The collision risk may include not only a risk of collision between the moving body and the vehicle 1 but also a risk of failure to be incurred on the occasion that the vehicle 1 collides with the moving body. Specifically, the risk calculation unit 65 predicts a plurality of driving actions of the moving body detected. Moreover, the risk calculation unit 65 sets a plurality of the driving conditions of the vehicle 1. Thus, the risk calculation unit 65 calculates the collision risks between the moving body and the vehicle 1 after a predetermined period of time, for the respective driving conditions of the vehicle 1, on the basis of: predicted distances between the moving body and the vehicle 1 after the predetermined period of time; and probabilities that the moving body makes operations for the respective driving actions.

The driving action of the moving body refers to a state of motion of the moving body to be defined by a steering angular speed ωo and an acceleration rate ao of the moving body. Moreover, the driving condition of the vehicle 1 refers to a driving condition of the vehicle 1 to be defined by a steering angular speed ωe of the steering wheel of the vehicle 1 and an acceleration rate αe of the vehicle 1.

(Driving Condition Setting Unit)

The driving condition setting unit 67 selects the driving condition of the vehicle 1 that provides a smallest one of the collision risks, on the basis of the collision risks obtained by the risk calculation unit 65. The driving condition setting unit 67 sets, as target values, the steering angular speed ωe and the acceleration rate αe corresponding to the selected driving condition, and transmits these pieces of data to the vehicle control device 41. Upon receipt of the data regarding the driving condition, the vehicle control device 41 controls driving of each control device on the basis of the data regarding the driving condition set. Thus, the risk of collision of the vehicle 1 with respect to the moving body is reduced. Alternatively, the risk of failure to be incurred on the occasion that the vehicle 1 collides with the moving body is reduced.

<3. Specific Processing of Driver Assistance Apparatus>

Next, an operation example of the driver assistance apparatus 50 according to the present embodiment is described in detail. It is to be noted that, in the following description, an example is described where the moving body is a random vehicle.

FIG. 3 is a flowchart illustrating an example of processing to be carried out by the processor 51 of the driver assistance apparatus 50.

First, upon a start-up of an on-vehicle system including the driver assistance apparatus 50 (step S11), the vehicle data acquisition unit 63 of the processor 51 acquires the data regarding the vehicle 1 (step S13). Specifically, the vehicle data acquisition unit 63 acquires the data regarding the operation state and the behavior of the vehicle 1 on the basis of the detection data transmitted from the vehicle state sensor 35. The vehicle data acquisition unit 63 acquires at least the data regarding the operation state of the vehicle 1 such as the steering angle of the steering wheel or the steering wheel, the accelerator position, the amount of the brake operation, or the engine speed, and the data regarding the behavior of the vehicle 1 such as the vehicle speed, the longitudinal acceleration rate, the lateral acceleration rate, and the yaw rate. The vehicle data acquisition unit 63 records these pieces of the acquired data in the storage 53.

Next, the surrounding environment data acquisition unit 61 of the processor 51 acquires surrounding environment data around the vehicle 1 (step S15). Specifically, the surrounding environment data acquisition unit 61 detects an obstacle present around the vehicle 1 and the traveling lane of the vehicle 1 on the basis of the detection data transmitted from the surrounding environment sensor 31. Moreover, the surrounding environment data acquisition unit 61 calculates the position, the size, the direction, and the speed of the obstacle detected, the distance from the vehicle 1 to the obstacle, and the relative speed of the obstacle to the vehicle 1. Furthermore, the surrounding environment data acquisition unit 61 calculates the distance from the vehicle 1 to an edge of the traveling lane detected.

For example, the surrounding environment data acquisition unit 61 detects the obstacle ahead of the vehicle 1 and the kind of the obstacle with the use of, for example, a pattern matching technique, by performing image processing on the image data transmitted from the forward view capturing cameras 31LF and 31RF. Moreover, the surrounding environment data acquisition unit 61 calculates the position and the size of the obstacle as viewed from the vehicle 1, and the distance to the obstacle, on the basis of the position of the obstacle in the image data, a size of an occupied area by the obstacle in the image data, and data regarding parallax of the left and right forward view capturing cameras 31LF and 31RF. Moreover, the surrounding environment data acquisition unit 61 calculates the relative speed of the obstacle to the vehicle 1 by time differentiating a change in the distance. Furthermore, the surrounding environment data acquisition unit 61 calculates the speed of the obstacle by adding the speed of the vehicle 1 to the relative speed of the obstacle to the vehicle 1.

Moreover, the surrounding environment data acquisition unit 61 may detect the obstacle on the basis of the detection data transmitted from the LiDAR 31S. For example, the surrounding environment data acquisition unit 61 may calculate the position, the kind, and the size of the obstacle, the distance from the vehicle 1 to the obstacle, the relative speed of the obstacle to the vehicle 1, and the speed of the obstacle, on the basis of data regarding time from transmission of electromagnetic waves from the LiDAR 31S to reception of reflected waves, a direction in which the reflected waves are received, and a range of a group of measured points of the reflected waves.

Moreover, in a case where the surrounding environment data acquisition unit 61 detects a random vehicle, the surrounding environment data acquisition unit 61 calculates a direction of the relevant random vehicle. It is possible to estimate the direction of the random vehicle on the basis of an inclination of a front part or a rear part of the random vehicle relative to, for example, an angle of view of the forward view capturing camera 31LF or 31RF, or the LiDAR 31S. However, a method of obtaining the direction of the random vehicle is not limited to the above-mentioned example.

Furthermore, in the case where the surrounding environment data acquisition unit 61 detects the random vehicle, the surrounding environment data acquisition unit 61 calculates the yaw rate of the relevant random vehicle. It is possible to estimate the yaw rate of the random vehicle on the basis of, for example, the change in the posture of the random vehicle obtained from the detection data of the forward view capturing cameras 31LF and 31RF, or the LiDAR 31S. However, the method of obtaining the yaw rate of the random vehicle is not limited to the example mentioned above. Moreover, in the case where the vehicle 1 and the random vehicle are able to establish vehicle-to-vehicle communication, the surrounding environment data acquisition unit 61 may acquire, from the random vehicle, by the vehicle-to-vehicle communication, the data regarding the yaw rate, the yaw acceleration rate, the yaw angle acceleration rate, the vehicle speed, and the acceleration rate. The surrounding environment data acquisition unit 61 stores the acquired surrounding environment data in the storage 53.

Next, the risk calculation unit 65 of the processor 51 determines presence or absence of any random vehicles detected, as the obstacle detected by the surrounding environment data acquisition unit 61 (step S17). In a case with the absence of any random vehicles detected (S17/No), the processor 51 determines whether or not the on-vehicle system has stopped (step S25). Unless the on-vehicle system is stopped (S25/No), the processor 51 causes the flow to return to step S13 and repeatedly carry out the processes of the above-described steps. Meanwhile, in a case with the presence of the random vehicle detected (S17/Yes), the risk calculation unit 65 calculates the collision risk of the vehicle 1 with respect to the random vehicle (step S19).

FIG. 4 is a flowchart illustrating risk calculation processing.

First, the risk calculation unit 65 predicts the plurality of the driving actions of the random vehicle (step S31). The risk calculation unit 65 sets a plurality of the steering angular speeds $\omega o$ and a plurality of the acceleration rates $\alpha o$ of the random vehicle within ranges assumed from a traveling state, e.g., the current yaw rate and the vehicle speed, of the random vehicle detected by the surrounding environment data acquisition unit 61. For example, data regarding a preset range of the steering angular speed $\omega o$ assumed in accordance with the value of the yaw rate, and data regarding a preset range of the acceleration rate $\alpha o$ assumed in accordance with the vehicle speed are held in advance in the storage 53. With reference to these pieces of data, the risk calculation unit 65 sets the plurality of the steering angular speeds $\omega o$ and the plurality of the acceleration rates $\alpha o$ of the random vehicle. Moreover, the risk calculation unit 65 calculates each of the positions of the random vehicle after the predetermined period of time, on the basis of the steering angular speeds $\omega o$ and the acceleration rates $\alpha o$ set, and the position, the direction, the vehicle speed, and the yaw rate of the random vehicle detected by the surrounding environment data acquisition unit 61.

FIG. 5 is an explanatory diagram illustrating an example of the prediction of the driving actions of the random vehicle 90. The random vehicle 90 illustrated in FIG. 5 is a random vehicle 90 that travels in parallel in the same direction as the vehicle 1. The risk calculation unit 65 sets the plurality of the steering angular speeds $\omega o$ and the plurality of the acceleration rates $\alpha o$ of the random vehicle 90 within the ranges assumed from the vehicle speed and the yaw rate of the random vehicle 90. In FIG. 5, a combination ($\omega$, $\alpha o$) of the steering angular speed $\omega$ and the acceleration rate $\alpha o$ is set in four patterns (−5, 0), (0, 0), (5, 0), and (5, −1). Moreover, the positions of the random vehicle 90 after 1 second and after 2 seconds are calculated in a case where the random vehicle 90 travels in accordance with the respective driving actions. The steering angular speed $\omega o$ assumes a positive value in a rightward (clockwise) direction.

It is to be noted that, in FIG. 5, the four driving actions are set, but the number of the driving actions to be set is not limited to four, and may be set to any number within ranges available for setting of the steering angular speed ωo and the acceleration rate αo. Moreover, a time interval indicating the positions of the random vehicle 90 does not have to be an interval of 1 second, but may be set to any length of time. In a case with presence of multiple random vehicles, the risk calculation unit 65 calculates, for each of the multiple random vehicles, the plurality of the driving actions assumed, and the positions of the random vehicle 90 after the predetermined period of time in the case where the random vehicle 90 travels while taking the respective driving actions.

Moreover, in predicting the driving actions of the random vehicle 90, the risk calculation unit 65 may predict the driving actions in consideration of the presence of an obstacle around the random vehicle 90. For example, the risk calculation unit 65 may limit the ranges of the steering angular speed ωo and the acceleration rate αo to be set, in consideration that the random vehicle 90 takes a driving action to avoid collision with the obstacle.

Next, the risk calculation unit 65 sets the plurality of the driving conditions of the vehicle 1 (step S33). The risk calculation unit 65 sets a plurality of the steering angular speeds ωe and a plurality of the acceleration rates αe of the vehicle 1 within ranges assumed from the current traveling state of the vehicle 1 acquired by the vehicle data acquisition unit 63. For example, similarly for the vehicle 1 as well, the risk calculation unit 65 sets the plurality of the steering angular speeds we and the plurality of the acceleration rates αe of the vehicle 1 with reference to the data held in advance in the storage 53. Moreover, the risk calculation unit 65 calculates each of the positions of the vehicle 1 after the predetermined period of time on the basis of the steering angular speeds we and the acceleration rates αe set, and the current position, the direction, the vehicle speed, and the steering angle of the vehicle 1.

Next, the risk calculation unit 65 obtains, by calculation, the collision risks of the vehicle 1 with respect to the random vehicle 90, for the respective driving conditions of the vehicle 1 set in step S33 (step S35). In the present embodiment, the risk calculation unit 65 calculates collision risks R, for each of the set driving conditions of the vehicle 1, on the basis of distances D from the vehicle 1 to the random vehicle 90 after the predetermined period of time in the case where the random vehicle 90 travels in accordance with the respective driving actions set, and the probabilities that the random vehicle 90 takes the respective driving actions. More specifically, in the present embodiment, for each of the combinations of the driving condition of the vehicle 1 and the driving action of the random vehicle 90, the risk calculation unit 65 sets a sum of risks r at each of the times from the time 0 second to any time t seconds, as the collision risk R.

FIGS. 6 to 9 are explanatory diagrams illustrating an example of calculation of the risk r at the predetermined time. FIG. 6 illustrates the position of the vehicle 1 after 1 second in a case where the combination (ωe, αe) of the steering angular speed we and the acceleration rate αe is set to (5, 0) as the driving condition of the vehicle 1. In this case, as illustrated in FIG. 7, for example, in a case where the combination (ωo, αo) of the steering angular speed ωo and the acceleration rate αo is set to (5, −1) as the driving action of the random vehicle 90, the distance D between the random vehicle 90 and the vehicle 1 after 1 second is 2 m. It is to be noted that the positions of the random vehicle 90 and the vehicle 1 may each be a preset position of a center of gravity of the vehicle, or a position of a center of a front part of the vehicle, and may be set at any position.

The risk calculation unit 65 calculates the risk r, with the use of the following expression (1), on the basis of the distance D between the vehicle 1 and the random vehicle 90 after the predetermined period of time, and the probability that the random vehicle 90 is operated with each of the driving actions. The risk r represented by the following expression (1) is obtained, with respect to the position of the vehicle 1 at each of the times, by multiplying a reciprocal of the distance D between the random vehicle 90 and the vehicle 1 at the relevant time, by probability that the random vehicle 90 is present at the relevant position. In the following expression (1), the probability that the random vehicle 90 is present at the relevant position is expressed as a product of probability Ps that the steering angular speed ωo of the random vehicle 90 set is realized, and probability Pa that the acceleration rate αo is realized.

$$\text{Risk } r = (1/D) \times (Ps) \times (Pa) \tag{1}$$

r: Risk at each of the times
D: Distance between the random vehicle 90 and the vehicle 1
Ps: Probability of the steering angular speed ωo of the random vehicle 90
Pa: Probability of the acceleration rate αo of the random vehicle 90

FIGS. 8 and 9 are explanatory diagrams illustrating examples of the probability Ps [%] of the steering angular speed ωo of the random vehicle 90 and the probability Pa [%] of the acceleration rate αo, respectively. Data regarding each of the probabilities Ps and Pa is obtained on the basis of frequency of an amount of operation obtained from statistical data regarding amounts of previous operations of the vehicle. The data regarding the probabilities Ps and Pa may be set in accordance with at least one of a yaw angle acceleration rate or a longitudinal acceleration rate of the vehicle. Obtaining each of the probabilities Ps and Pa in accordance with the yaw angle acceleration rate or the longitudinal acceleration rate of the random vehicle 90 makes it possible to obtain more accurately the probabilities Ps and Pa of the steering angular speed ωo and the acceleration rate αo with which the random vehicle 90 is configured to operate. The data regarding the probabilities Ps and Pa may be prepared in advance and held in the storage 53, or may be held in an external server that is able to communicate with the driver assistance apparatus 50 through mobile wireless communication means.

Alternatively, the risk calculation unit 65 may calculate the probabilities Ps and Pa that the random vehicle 90 takes each of the driving actions in the traveling state of the random vehicle 90 detected and the surrounding environment. In this case, the driver assistance apparatus 50 includes a driving action database that holds previous driving actions taken by multiple vehicles including the vehicle 1 and the specific random vehicle 90 without limitation, in association with data regarding the traveling states and the surrounding environment while the vehicles are traveling. Thus, on the basis of the traveling state of the random vehicle 90 detected and the surrounding environment, the risk calculation unit 65 extracts, from the driving action database, driving action data acquired in the same environment, and obtains the probability Ps of the steering angular speed ωo and the probability Pa of the acceleration rate αo.

This makes it possible to obtain more accurately the probability that the random vehicle 90 takes each of the driving actions.

In the example illustrated in FIG. 7, the distance D between the vehicle 1 and the random vehicle 90 after 1 second is 2 m. The probability Ps of the steering angular speed ωo is 10(%). The probability Pa of the acceleration rate αo is 20(%). The risk r given by the following expression (1) is "100 (=½×10×20)". The risk calculation unit 65 makes the calculation of the risks r for each combination of the driving condition of the vehicle 1 and the driving action of the random vehicle 90 from the time 0 second to any time t seconds, and sets a sum of the calculated risks r as the collision risk R for each of the driving conditions of the vehicle 1. Accordingly, for each of the driving conditions of the vehicle 1, the corresponding number of the collision risks R to the number of the set driving actions of the random vehicle 90 are calculated.

Returning to FIG. 3, after carrying out the risk calculation processing in step S19, the driving condition setting unit 67 selects the driving condition of the vehicle 1 that provides the smallest one of the obtained collision risks R (step S21). Specifically, the driving condition setting unit 67 identifies the smallest collision risk R from among the collision risks R obtained by the risk calculation processing, and sets the driving condition of the vehicle 1 used in the calculation of the relevant collision risk R, as the driving condition to be outputted to the vehicle control device 41.

Next, the driving condition setting unit 67 transmits data regarding the steering angular speed ωe and the acceleration rate αe set as the driving condition, to the vehicle control device 41 (step S23). Upon receiving the data regarding the steering angular speed ωe and the acceleration rate αe, the vehicle control device 41 carries out the automated driving control of the vehicle 1, with the steering angular speed we and the acceleration rate αe as target values. This makes it possible to reduce the collision risk of the vehicle 1 with respect to the random vehicle 90.

As described above, in the case with the random vehicle 90 detected around the vehicle 1, the driver assistance apparatus 50 according to the present embodiment predicts the plurality of the driving actions of the random vehicle 90, and obtains, by calculation, the collision risks R after the predetermined period of time on the occasion that the random vehicle 90 takes the respective driving actions, for each of the driving conditions available for setting in the vehicle 1. Thus, the driver assistance apparatus 50 selects the driving condition of the vehicle 1 that provides the smallest one of the collision risks R obtained, and sets the selected driving condition as the driving condition to be outputted to the vehicle control device 41. In this way, the driving condition of the vehicle 1 is set on the basis of the collision risk R reflecting the predicted driving action of the random vehicle 90, making it possible to reduce the collision risk of the vehicle 1 with respect to the random vehicle 90.

Moreover, the driver assistance apparatus 50 according to the present embodiment obtains the positions of the vehicle 1 after the predetermined period of time for the respective driving conditions available for setting in the vehicle 1. Moreover, the driver assistance apparatus 50 calculates the risks r after the predetermined period of time for each of the driving actions of the random vehicle 90, on the basis of the current yaw rate and the speed of the random vehicle 90 detected, the distance between the random vehicle 90 and the vehicle 1 after the predetermined period of time by the assumed steering angular speed ωo and the assumed acceleration rate αo of the random vehicle 90, the probability Ps that the random vehicle 90 is operated with the set steering angular speed ωo, and the probability Pa that the random vehicle 90 is operated with the set acceleration rate αo. Thus, the driver assistance apparatus 50 sets the sum of the risks r from the time 0 second to any time t seconds later, as the collision risk R for each of the driving actions of the random vehicle 90 for each of the driving conditions of the vehicle 1. Accordingly, the higher the probability that the random vehicle 90 takes each of the driving actions, the higher the collision risk R, leading to enhancement of an effect of reducing the collision risk of the vehicle 1 with respect to the random vehicle 90. Moreover, setting the driving condition of the vehicle 1 on the basis of the risk of collision over a predetermined duration of time makes it possible to enhance the effect of reducing the collision risk of the vehicle 1 with respect to the random vehicle 90.

Moreover, the driver assistance apparatus 50 may calculate the probabilities that the random vehicle 90 takes the respective driving actions, on the basis of the driving action database that holds the previous driving actions taken by the multiple vehicles in association with the data regarding the traveling states and the surrounding environment while the vehicles are traveling. This makes it possible to obtain more accurately the probabilities that the random vehicle 90 takes the respective driving actions. Moreover, in a case where the driving action database is held in a server accessible from the driver assistance apparatus 50 through the mobile communication means, it is possible to sequentially update or accumulate the data regarding the driving actions of the multiple vehicles in association with the data regarding the traveling states and the surrounding environment while the vehicles are traveling. Hence, it is possible to enhance accuracy of the probabilities that the random vehicle 90 takes the respective driving actions, leading to enhancement of the effect of reducing the collision risk of the vehicle 1 with respect to the random vehicle 90.

<4. Modification Examples>

Although one embodiment of the technology of the disclosure has been described above, various modifications of the forgoing embodiment may be made, or functions may be added to the forgoing embodiment. In the following, some modification examples of the driver assistance apparatus 50 according to the forgoing embodiment are described.

(4-1. First Modification Example)

In the driver assistance apparatus 50 according to the forgoing embodiment, the collision risks R are calculated in consideration of possibility of collision between the vehicle 1 and the random vehicle 90. However, the collision risks R may be calculated in consideration of the risk of failure to be incurred by the collision between the vehicle 1 and the random vehicle 90 (hereinafter, also simply referred to as a "failure risk").

For example, the risk calculation unit 65 may calculate a risk r1 after the predetermined period of time, on the basis of at least one of a relative speed ΔV of the random vehicle 90 to the vehicle 1, or an angle θ formed by the direction of the vehicle 1 and the direction of the random vehicle 90. Generally, the larger the relative speed ΔV of the random vehicle 90 to the vehicle 1, the greater the failure to be incurred by the collision. Moreover, the smaller the angle θ formed by the direction of the vehicle 1 and the direction of the random vehicle 90, the greater an impact at the time of the collision, resulting in a greater failure to be incurred.

For example, the risk calculation unit 65 calculates the risk r1, with the use of the following expression (2), on the basis of the distance D between the vehicle 1 and the random vehicle 90 after the predetermined period of time, the probability that the random vehicle 90 is operated with each of the driving actions, the relative speed ΔV of the random vehicle 90 to the vehicle 1, and the angle θ formed by the direction of the vehicle 1 and the direction of the random vehicle 90. The risk r1 given in the following expression (2) is an addition of the relative speed ΔV of the random vehicle 90 to the vehicle 1, and a reciprocal of the angle θ formed by the direction of the vehicle 1 and the direction of the random vehicle 90, to the risk r obtained by the expression (1) mentioned above.

$$\text{Risk } r1 = (1/D) \times (Ps) \times (\text{Pa}) + (\Delta V) + (1/\theta) \quad (2)$$

r1: Risk at each of the times
D: Distance between the random vehicle 90 and the vehicle 1
Ps: Probability of the steering angular speed ωo of the random vehicle 90
Pa: Probability of the acceleration rate αo of the random vehicle 90
ΔV: Relative speed of the random vehicle 90 to the vehicle 1
θ: Angle formed by the direction of the vehicle 1 and the direction of the random vehicle 90

It is to be noted that, in a case where the risk r1 is calculated in consideration of only one of the relative speed ΔV of the random vehicle 90 to the vehicle 1 or the angle θ formed by the direction of the vehicle 1 and the direction of the random vehicle 90, either the relative speed ΔV or the reciprocal of the angle θ in the expression (2) mentioned above may be omitted, or assumed to be zero.

FIG. 10 is an explanatory diagram illustrating an example of the calculation of the risk r1 at the predetermined time in consideration of the failure risk. FIG. 10 illustrates the directions of the vehicle 1 and the random vehicle 90 at the respective positions of the vehicle 1 and the random vehicle 90 after 1 second illustrated in FIG. 7. It is possible to estimate the direction of the vehicle 1 after the predetermined period of time, on the basis of the steering angular speed ωe and the acceleration rate αe set, and the data regarding the traveling state of the vehicle 1 such as the current vehicle speed, the acceleration rate, and the yaw rate. Moreover, it is possible to estimate the direction of the random vehicle 90 after the predetermined period of time, on the basis of the steering angular speed ωo and the acceleration rate αo set, and the data regarding the traveling state of the random vehicle 90 such as the current vehicle speed, the acceleration rate, and the yaw rate. The risk calculation unit 65 may estimate the direction of the vehicle 1 or the random vehicle 90 in additional consideration of a state of friction of a road surface.

The risk calculation unit 65 performs the calculation of the risk r1 for each combination of the driving condition of the vehicle 1 and the driving action of the random vehicle 90 from the time 0 second to any time t seconds, and sets the sum of the calculated risks r1 as the collision risk R for each of the driving conditions of the vehicle 1. Thus, calculating the risk r1 after the predetermined period of time in additional consideration of at least one of the relative speed ΔV of the random vehicle 90 to the vehicle 1 or the angle θ formed by the direction of the vehicle 1 and the direction of the random vehicle 90 makes it possible to reduce the risk of collision of the vehicle 1 with respect to the random vehicle 90. Moreover, even in the case where the collision occurs, it is possible to reduce the risk of failure to be incurred.

Furthermore, the risk calculation unit 65 may calculate a risk r2 after the predetermined period of time on the basis of a collision position of the vehicle 1 with respect to the random vehicle 90. In this case, the risk calculation unit 65 calculates the risk r2 with the use of, for example, the following expression (3), on the basis of the distance D between the vehicle 1 and the random vehicle 90 after the predetermined period of time, the probability that the random vehicle 90 is operated with each of the driving actions, and collision position risk Q in accordance with the collision position of the vehicle 1 with respect to the random vehicle 90. The risk r2 represented by the following expression (3) is an addition of the collision position risk Q in accordance with the assumed collision position to the risk r obtained by the expression (1) mentioned above.

$$\text{Risk } r2 = (1/D) \times (Ps) \times (\text{Pa}) + (Q) \quad (3)$$

D: Distance between the random vehicle 90 and the vehicle 1
Ps: Probability of the steering angular speed ω of the random vehicle 90
Pa: Probability of the acceleration rate αo of the random vehicle 90
Q: Collision position risk of the vehicle 1 with respect to the random vehicle 90

The collision position risk Q may be a risk value to be set for each collision position of the vehicle 1 on the basis of, for example, a characteristic indicating an influence of an impact the vehicle 1 receives due to the collision. In this case, data regarding the collision position risk is held in advance in the storage 53. The collision position risk is set for each collision position of the vehicle 1 on the basis of the characteristic indicating the influence of the impact the vehicle 1 receives due to the collision. Moreover, the collision position risk Q may be a risk value that is set for each collision position in accordance with, for example, a position and a body size of an occupant of the vehicle 1. In this case, for example, at a start of the driving of the vehicle 1, the driver assistance apparatus 50 acquires data regarding, for example, the position, and the body size or the age of the occupant inputted by a user, and records the data in the storage 53.

FIG. 11 is an explanatory diagram illustrating an example of the calculation of the risk r2 at the predetermined time in consideration of the collision position risk. FIG. 11 illustrates the directions of the vehicle 1 and the random vehicle 90, and the data regarding the occupant of the vehicle 1 and the collision position risk, at the respective positions of the vehicle 1 and the random vehicle 90 after 1 second illustrated in FIG. 7. In the example illustrated in FIG. 11, the vehicle 1 accommodates a driver Dr seated on the driver's seat and an infant B seated on the right side of a rear seat. Accordingly, the collision position risk of a left rear part of the vehicle 1 close to the infant B is set to 100 (points). The collision position risk of a left front part and a right rear part is set to 10 (points). The collision position risk of a front part is set to 1 (point). This results in a rise in the risk r2 of the driving condition of the vehicle 1 in which the collision position of the vehicle 1 with respect to the random vehicle 90 may possibly become the left rear part. However, setting of the collision position risk is not limited to the example illustrated in FIG. 11.

Thus, setting the collision position risk of the vehicle 1 with respect to the random vehicle 90 to calculate the risk r2 after the predetermined period of time eliminates possibility of setting of the driving condition on which a considerable failure is assumed to be incurred by the collision. This makes it possible to reduce the risk of the collision of the vehicle 1 with respect to the random vehicle 90. Moreover, even in the case where the collision occurs, it is possible to reduce the risk of failure to be incurred.

It is to be noted that the failure risk is not limited to the collision position risk to be set in accordance with the collision position of the vehicle 1, but any other risk may be set that relates to a failure to be conceivably incurred by the collision. For example, in a case where the random vehicle 90 has large weight, collision energy becomes large, resulting in a considerable failure. Accordingly, the risk calculation unit 65 may calculate the collision risk by adding a weight risk. The weight risk is set on the basis of the weight of the random vehicle 90 estimated from the kind or the size of the random vehicle 90.

(4-2. Second Modification Example)

In the driver assistance apparatus 50 according to the forgoing embodiment, the probabilities that the random vehicle 90 takes the respective driving actions are calculated without considering a tendency of the driving action of the random vehicle 90. However, the probabilities that the random vehicle 90 takes the respective driving actions may be calculated on the basis of a driving characteristic indicating the tendency of the driving action of the random vehicle 90. For example, a driving action database is provided in an external server to which the driver assistance apparatus 50 is configured to access through wireless communication means. The driving action database holds the previous driving actions taken by multiple vehicles including the vehicle 1 and the specific random vehicle 90 without limitation, in association with identification data regarding each vehicle and data regarding traveling states and the surrounding environment while the vehicles are traveling.

Here, the "driving characteristic" indicating the tendency of the driving action refers to a personal characteristic related to preference in driving and a tendency of driving operations, e.g., driving styles and a way of feeling fear in driving.

For example, examples of the driving styles are "preference for observing a speed limit," "preference for ensuring a sufficient inter-vehicle distance to a preceding vehicle," "preference for decelerating sufficiently before entering a curve," "preference for proceeding as much as possible even by making a lane change," and "preference for shortening an inter-vehicle distance to a preceding vehicle as much as possible." Moreover, the way of feeling fear in driving is exemplified by, for example, "roads with lots of parked vehicles on the streets", "driving at midnight", "roads with lots of blind spots", "situations with lots of vehicles at high vehicle speeds", "situations with heavy traffic", assuming what kind of traveling environment makes a person feel fear. The driving characteristic is held in association with the identification data regarding the vehicle, as data regarding, for example, five-grade evaluation of items representing one or more driving characteristics such as a degree of caution or a degree of impatience.

The risk calculation unit 65 transmits, to the external server, data that allows for recognition of the random vehicle 90, along with the data regarding the traveling state of the random vehicle 90 detected and the surrounding environment, and identifies the driving characteristic of the random vehicle 90. The data that allows for the recognition of the random vehicle 90 may be, for example, an example of numerals on a number plate identified from the detection data by the forward view capturing cameras 31LF and 31RF, or may be the identification data acquired from the random vehicle 90 by the vehicle-to-vehicle communication. It is to be noted that, in a case where the random vehicle 90 holds the data regarding the driving characteristic of the random vehicle 90, the risk calculation unit 65 may acquire the data regarding the driving characteristic from the random vehicle 90 by the vehicle-to-vehicle communication.

Moreover, the risk calculation unit 65 extracts, from the driving action database, the driving action data regarding the previous driving actions taken in the same environment by a vehicle having the same driving characteristic as the driving characteristic of the random vehicle 90. Thus, the risk calculation unit 65 predicts the plurality of the driving actions of the random vehicle 90 on the basis of the driving action data extracted from the driving action database regarding the previous driving actions taken in the same environment, and calculates the probabilities that the random vehicle 90 takes the respective driving actions in the traveling state of the random vehicle 90 and the surrounding environment. This makes it possible to obtain the probabilities that the random vehicle 90 takes the respective driving actions, in consideration of the driving characteristic of the random vehicle 90 detected. Hence, it is possible to obtain more accurately the collision risks R that reflect the predicted driving actions of the random vehicle 90, leading to the setting of the driving condition with low risk of the collision of the vehicle 1 with respect to the random vehicle 90.

(4-3. Third Modification Example)

In the forgoing embodiment, the risk calculation unit 65 sets the driving action of the random vehicle 90. However, in a case where the random vehicle 90 is an automated driven vehicle, the risk calculation unit 65 may acquire data regarding the driving condition from the random vehicle 90. In this case, it is possible for the risk calculation unit 65 to estimate the position of the random vehicle 90 after predetermined period of time by acquiring data regarding a planned travel locus, the vehicle speed, and the acceleration rate of the random vehicle 90 through, for example, the vehicle-to-vehicle communication. The risk calculation unit 65 sets the probability that the random vehicle 90 takes the relevant driving action to 100%, and calculates the risk r of the vehicle 1 at the predetermined time. Thus, the collision risk R of the vehicle 1 with respect to the random vehicle 90 after the predetermined period of time is calculated on the basis of the highly reliable data regarding the driving action of the random vehicle 90. This makes it possible to set the driving condition with low risk of the collision of the vehicle 1 with the random vehicle 90.

Although preferred embodiments of the disclosure have been described in the foregoing with reference to the accompanying drawings, the disclosure is by no means limited to such examples. It should be appreciated that various modifications and alterations may be made by persons skilled in the art without departing from the scope as defined by the appended claims. The disclosure is intended to include such modifications and alterations in so far as they fall within the scope of the appended claims.

For example, in the foregoing embodiments, all the functions of the driver assistance apparatus 50 are mounted on the vehicle 1, but the disclosure is not limited to such an example. For example, some of the functions of the driver assistance apparatus 50 may be provided in a server apparatus configured to communicate through mobile communication means, and the driver assistance apparatus 50 may be configured to transmit and receive data to and from the server apparatus.

Moreover, in the forgoing embodiments, description is given of an example where the moving body is the random vehicle 90, as an example of specific processing of the driver assistance apparatus 50, but the moving body is not limited to vehicles. The moving body may be a bicycle or may be a pedestrian. In this case, probability of each driving action of the moving body may be set on the basis of statistical data regarding the driving actions of the moving body held in association with, for example, a kind and a direction of the moving body, and surrounding environment. Moreover, in the case where the moving body is a pedestrian or a bicycle, it is conceivable that greater damage is incurred by the collision, than in the case where the moving body is a vehicle. Accordingly, moving body risk in accordance with the kind of the moving body may be set, and the collision risk may be calculated by addition of the moving body risk.

DESCRIPTION OF REFERENCE NUMERALS

1: Vehicle (the vehicle)
9: Driving force source
13: Steering wheel
15: Electric steering device
20: Brake hydraulic control unit
31: Surrounding environment sensor
35: Vehicle state sensor
41: Vehicle control device
50: Driver assistance apparatus
51: Processor
53: Storage
61: Surrounding environment data acquisition unit
63: Vehicle data acquisition unit
65: Risk calculation unit
67: Driving condition setting unit
90: Random vehicle
$\alpha e$: Acceleration rate of the vehicle
$\alpha o$: Acceleration rate of random vehicle
$\omega e$: Steering angular speed of the vehicle
$\omega o$: Steering angular speed of random vehicle

The invention claimed is:

1. A driver assistance apparatus configured to set a driving condition of a vehicle based on a collision risk of the vehicle with a moving body around the vehicle, the driver assistance apparatus comprising:
one or more processors;
one or more memories communicably coupled to the one or more processors, wherein the one or more processors are configured to carry out processing including
detecting the moving body and surrounding environment around the vehicle,
obtaining a speed and a current yaw rate of the moving body detected,
predicting multiple driving actions of the moving body, based on acceleration rates and steering angular speeds of the moving body assumed from the current yaw rate and the speed of the moving body detected, and obtaining, assuming that the moving body takes each of the multiple driving actions, multiple positions that the moving body reaches after a predetermined period of time, the multiple positions of the moving body corresponding to the respective multiple driving actions,
setting multiple driving conditions based on a current yaw rate and a speed of the vehicle, and obtaining, assuming that the vehicle travels under each of the multiple driving conditions, multiple positions that the vehicle reaches after the predetermined period of time, the multiple positions of the vehicle corresponding to the respective driving conditions,
calculating multiple collision risks between the moving body and the vehicle after the predetermined period of time, each of the multiple collision risks corresponding to one of the multiple driving conditions of the vehicle based on distances between the moving body and the vehicle, obtained from the positions of the moving body and the positions of the vehicle, after the predetermined period of time, probabilities of performing operations at the respective acceleration rates by the moving body, and probabilities of performing operations at the respective steering angular speeds by the moving body, and
selecting one of the driving conditions corresponding to one of the multiple collision risks, and setting the one of the driving conditions of the vehicle; and
a vehicle controller configured to, using the one of the driving conditions, control the vehicle to avoid collision with the moving body.

2. The driver assistance apparatus according to claim 1, wherein
the processors are configured to calculate the collision risks after the predetermined period of time for the respective driving actions of the moving body, further based on at least one of a relative speed between the vehicle and the moving body, or an angle formed by a direction of the vehicle and a direction of the moving body.

3. The driver assistance apparatus according to claim 1, wherein
the processors are configured to calculate the collision risks after the predetermined period of time for the respective driving actions of the moving body, further based on a collision position of the vehicle with respect to the moving body.

4. The driver assistance apparatus according to claim 1, comprising a driving action database are configured to hold previous driving actions taken by multiple moving bodies, in association with traveling states and surrounding environment, wherein
the processors are configured to calculate, based on the driving action database, the probabilities of the moving body taking the respective driving actions in a traveling state of the moving body detected and the surrounding environment.

5. The driver assistance apparatus according to claim 4, wherein
the driving action database holds data regarding a driving characteristic of each of the moving bodies and the previous driving actions of the moving bodies, in association with the traveling states and the surrounding environment, and
the processors calculate, on the basis of the driving action database, the probabilities of the moving body taking the respective driving actions in the traveling state of the moving body detected and the surrounding environment.

6. The driver assistance apparatus according to claim 1, wherein, on a condition that the moving body includes a vehicle in automated driving, the processors acquire data regarding a driving action of the vehicle in automated driving, calculate the collision risks of the vehicle further with use of the acquired data regarding the driving action, and set the driving condition of the vehicle.

7. A non-transitory recording medium containing a computer program applicable to a driver assistance apparatus configured to set a driving condition of a vehicle based on a collision risk of the vehicle with a moving body around the vehicle, wherein the computer program causes one or more processors to carry out processing comprising:

- detecting the moving body and surrounding environment around the vehicle;
- obtaining a speed and a current yaw rate of the moving body detected;
- predicting multiple driving actions of the moving body, based on acceleration rates and steering angular speeds of the moving body assumed from the current yaw rate and the speed of the moving body detected, and obtaining, assuming that the moving body takes each of the multiple driving actions, multiple positions that the moving body reaches after a predetermined period of time, the multiple positions of the moving body corresponding to the respective multiple driving actions;
- calculating multiple collision risks between the moving body and the vehicle after the predetermined period of time, each of the multiple collision risks corresponding to tone of the multiple driving conditions of the vehicle based on distances between the moving body and the vehicle, obtained from the positions of the moving body and the positions of the vehicle, after the predetermined period of time, probabilities of performing operations at the respective acceleration rates by the moving body, and probabilities of performing operations at the respective steering angular speeds by the moving body,
- selecting one of the driving conditions corresponding to one of the multiple collision risks, and setting the one of the driving conditions of the vehicle; and
- using the one of the driving conditions, controlling the vehicle to avoid collision with the moving body.

* * * * *